Sept. 24, 1940.   J. NAZARKO   2,215,529
SHOP TRUCK AND ARTICLE CARRIER ASSEMBLY
Filed Feb. 28, 1938
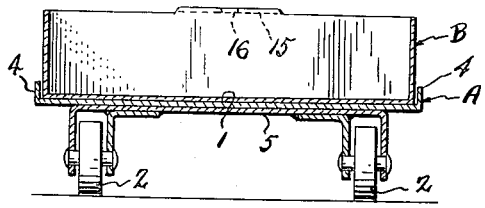
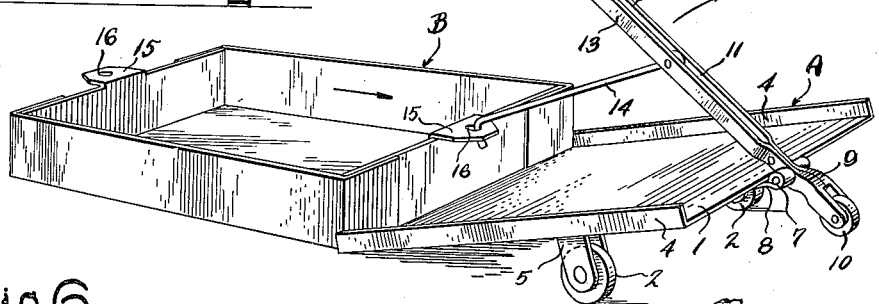
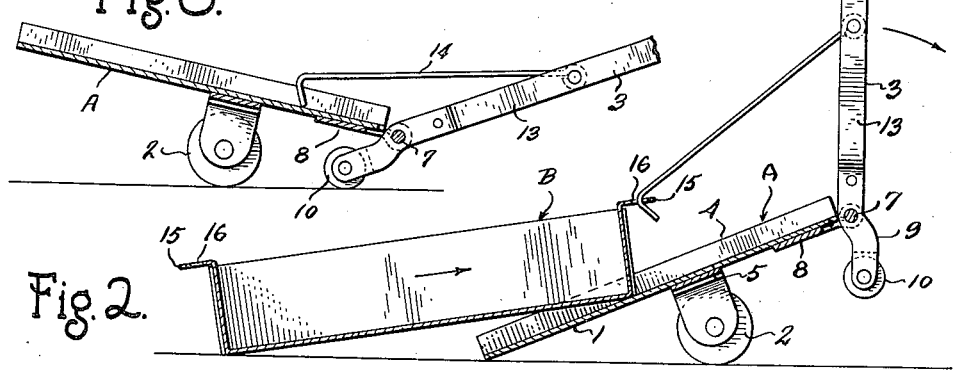
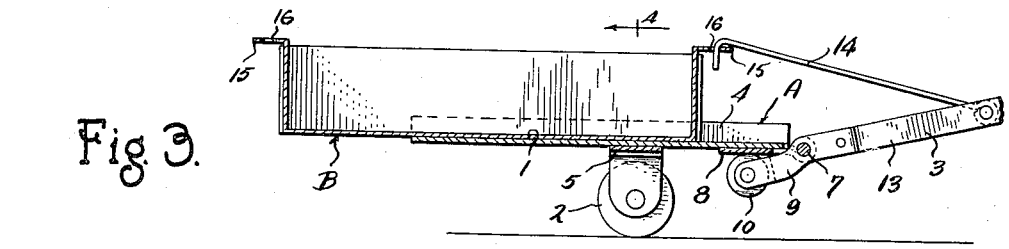
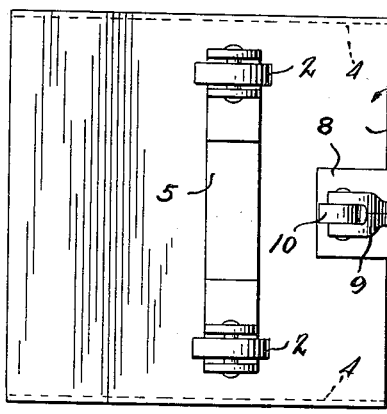
INVENTOR.
John Nazarko
BY
ATTORNEY.S Patented Sept. 24, 1940

2,215,529

UNITED STATES PATENT OFFICE 2,215,529

SHOP TRUCK AND ARTICLE CARRIER ASSEMBLY

John Nazarko, Detroit, Mich., assignor to Detroit Harvester Company, Detroit, Mich., a corporation of Michigan Application February 28, 1938, Serial No. 193,162

6 Claims. (Cl. 214—65.4)

This invention relates generally to shop trucks and refers more particularly to a combination shop truck and pan which as a unit may be used for carrying articles such as castings, forgings, bolts, rivets and the like from place to place in factories.

Heretofore it has been customary to load such articles into pans or other suitable receptacles and then to drag such loaded pans over the floors of the factory from one department to another. This required considerable effort on the part of the workmen and resulted in wear and injury to the pans and to the floors over which they were dragged. Therefore, it is an object of the present invention to avoid the difficulties just mentioned by providing a shop truck and pan combination that will facilitate the handling and conveyance of such articles.

Another object is to provide a combination that is comparatively simple in construction, economical to manufacture, and efficient in operation.

Other objects, advantages and novel details of construction of this invention will be made more apparent as this description proceeds, especially when considered in connection with the accompanying drawing, wherein:

Figure 1 shows the pan on the floor and shows the truck at one end of said pan with the handle arm and hook in position to load the pan onto the platform of the truck;

Figure 2 is a view of the pan and truck after the pan has been partially loaded onto the platform of the truck;

Figure 3 is a view of the pan and truck showing the pan fully loaded on the truck in position to be transported;

Fig. 4 is a sectional view taken on the line 4—4 of Figure 3;

Figure 5 is a bottom plan view of the truck per se; and

Figure 6 is a sectional view illustrating the manner in which the truck may be transported without the pan.

Referring now to the drawing, A is the truck and B is the pan of a combination embodying my invention.

As shown, the truck A has a platform 1, supporting wheels 2 and a handle arm 3. Preferably the platform 1 is formed from sheet metal and is provided at opposite side edges thereof with upstanding flanges 4. The wheels 2 are adjacent opposite sides of the platform substantially midway of its ends and are carried by a pressed metal crossbar 5 on the underside of the platform. The handle arm 3 is provided at one end with a loop handle 6 and is pivoted adjacent its other end on a pin 7 carried by a bracket 8 fixed to the underside of the platform. Preferably this arm 3 is provided below the pivot 7 with an elbow 9 that is movable beneath the bracket 8 and is provided at its free end with a caster 10. Located in a longitudinally extending slot 11 formed by offset portions 12 and 13 of the arm 3 is the pivoted end of a hook 14 that is engageable with the pan B, as will be hereinafter more fully described.

The pan B is also formed from sheet metal and is provided at each end thereof with an outwardly projecting tongue 15 having an opening 16 therein adapted to be engaged by the hook 14. Preferably the length of the pan B is substantially equal to the length of the platform 1, while the width of the pan is slightly less than the distance between the upstanding flanges 4 of said platform.

In use, while the pan B is upon the floor it is loaded with the articles to be carried and is then loaded onto the truck A by backing the rear end of said truck adjacent the forward end of the pan. The handle arm 3 is then swung rearwardly over the platform 1 to permit the hook 14 to engage the hole 16 in the adjacent tongue 15 of the pan. The handle arm 3 is then swung forwardly to cause the hook 14 to move the pan B onto and longitudinally of the platform 1. When the caster 10 at the free end of the elbow 9 of the arm abuts the bracket 8, the forward movement of the arm 3 is arrested. The pan B will then be in proper loaded position to be transported. The handle arm 3 is used to pull the truck, and the hook 14 is used to hold the pan B against displacement while the truck is in motion. When it is desired to unload the pan, the handle arm 3 is swung rearwardly to cause the hook 14 to push the pan B off the rear end of the platform 1. The hook 14 is then disengaged from the tongue 15. When the truck A is pulled empty, the caster 10 engages the ground and cooperates with the wheels 2 to support the truck.

What I claim as my invention is:

1. A shop truck having a platform provided substantially midway its ends with ground wheels so that the rear end thereof may tilt against the ground, and means at the forward end of the platform for sliding a receptacle onto the platform and for cooperating with the ground wheels aforesaid to support the forward end of the platform when moved in empty condition over the ground, including a handle arm pivoted intermediate its ends to the forward end of the platform and provided at its lower end below said pivotal connection with a ground wheel, and a hook carried by the arm above said pivotal connection and engageable with a receptacle to be slid onto the platform, the construction and arrangement of said arm, pivotal connection and platform being such that said last mentioned ground wheel is engageable with the underside of the platform when a receptacle is loaded onto the platform and is engageable with the ground when the platform is moved in empty condition over the ground.

2. A shop truck having a platform provided substantially midway its ends with ground wheels so that the rear end thereof may tilt against the ground, and means at the forward end of the platform for sliding a load onto the platform and for cooperating with the ground wheels aforesaid to support the forward end of the platform when moved in empty condition over the ground, including a handle arm pivoted intermediate its ends to the platform at its forward end and provided at its lower end below said pivotal connection with a ground engaging member, and means carried by the arm above said pivotal connection and engageable with a load to be slid onto the platform, the construction and arrangement of said arm, pivotal connection and platform being such that said ground engaging member is engageable with the underside of the platform when a load is on the platform and is engageable with the ground when the platform is moved in empty condition over the ground.

3. A shop truck having a platform provided substantially midway its ends with ground wheels so that the rear end thereof may tilt against the ground, and means at the forward end of the platform for sliding a load onto the platform and for cooperating with the ground wheels aforesaid to support the forward end of the platform when moved in empty condition over the ground, including a handle arm pivoted intermediate its ends to the platform at its forward end and provided at its lower end below said pivotal connection with a ground engaging member, the construction and arrangement of said arm, pivotal connection and platform being such that said ground engaging member is engageable with the underside of the platform when a load is on the platform and is engageable with the ground when the platform is moved in empty condition over the ground.

4. A shop truck having a platform provided substantially midway its ends with ground wheels so that the rear end thereof may tilt against the ground, and means at the forward end of the platform for sliding a load onto the platform and for cooperating with the ground wheels aforesaid to support the forward end of the platform when moved in empty condition over the ground, including an arm pivoted intermediate its ends to the platform at its forward end and provided at its lower end below said pivotal connection with a ground engaging member, said arm being provided at its upper free end with a handle and provided intermediate the handle and pivotal connection with a longitudinally extending slot, and means engageable with a load to be slid onto the platform including a hook pivoted in the slot in the arm and engageable with the load, the construction and arrangement of said arm, pivotal connection and platform being such that said ground engaging member is engageable with the underside of the platform when a load is on the platform and is engageable with the ground when the platform is moved in empty condition over the ground.

5. A shop truck having a platform provided substantially midway its ends with ground wheels so that the rear end thereof may tilt against the ground, and means at the forward end of the platform for sliding a load onto the platform and for cooperating with the ground wheels aforesaid to support the forward end of the platform when moved in empty condition over the ground, including a handle arm pivoted intermediate its ends to the platform at its forward end and provided at its lower end below said pivotal connection with a ground-engaging member, said arm being provided above said pivotal connection with a longitudinally extending slot, and means pivoted within said slot and engageable with a load to be slid onto the platform, the construction and arrangement of said arm, pivotal connection and platform being such that said ground-engaging member is engageable with the underside of the platform when a load is on the platform and is engageable with the ground when the platform is moved in empty condition over the ground.

6. A shop truck having a platform provided substantially midway its ends with ground wheels so that the rear end thereof may tilt against the ground, and means at the forward end of the platform for sliding a load onto the platform and for cooperating with the ground wheels aforesaid to support the forward end of the platform when moved in empty condition over the ground, including a handle arm pivoted intermediate its ends to the platform at its forward end and provided at its lower end below said pivotal connection with a ground-engaging wheel, said arm being provided above said pivotal connection with a longitudinally extending slot, and a hook pivoted within said slot and engageable with a load to be slid onto the platform, the construction and arrangement of said arm, pivotal connection and platform being such that said ground-engaging wheel is engageable with the underside of the platform when a load is on the platform and is engageable with the ground when the platform is moved in empty condition over the ground.

JOHN NAZARKO.